United States Patent Office 3,459,367
Patented Aug. 5, 1969

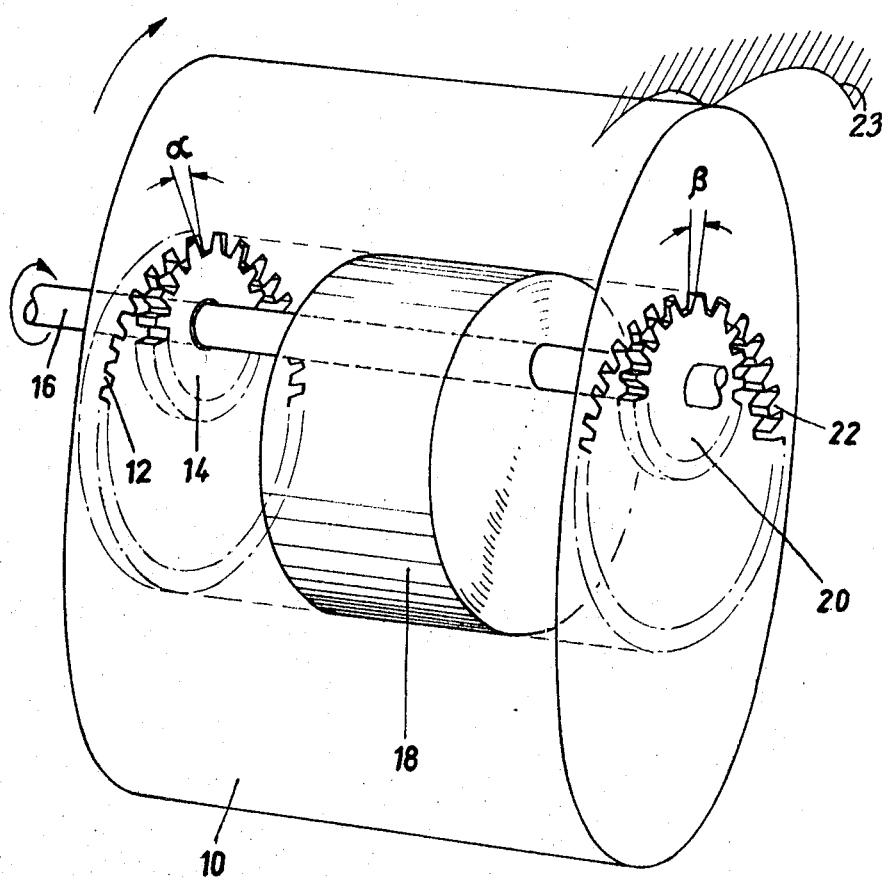

3,459,367
TRANSMISSION DRIVE FOR ROTARY PISTON VACUUM PUMP
Hansen Pfaff and Hartmut Sinn, Hanau am Main, and Maximilian Wutz, Gros-Krotzenburg, Germany, assignors to Leybold-Heraeus GmbH & Co., KG, Cologne-Bayental, Germany
Filed Oct. 6, 1967, Ser. No. 673,427
Claims priority, application Germany, Oct. 10, 1966, H 60,696
Int. Cl. F04c 17/02; F16h 55/18, 1/20
U.S. Cl. 230—145                                         3 Claims

ABSTRACT OF THE DISCLOSURE

An eccentrically rotatable hypotrochoidal piston is rotatable in a housing having the form of an appropriate enveloping figure; the piston has internal toothing formed in each end face, the toothing each matching with a pinion. The pinions are fixedly mounted to the housing, coaxially about the drive shaft, and angularly offset with respect to each other such that play between the piston and the drive shaft can be substantially eliminated.

---

The present invention concerns a transmission drive for a rotary piston vacuum pump having a piston rotating eccentrically within a housing forming a corresponding mantle therefor.

The piston carries out a motion which corresponds to eccentric rolling off on a fixed circle. The kinematics are obtained by an inner gear toothing of the piston rolls on a gear toothing of a fixed pinion. The drive is effected by an eccentric mechanism. When using such a machine as a vacuum pump, the piston must be guided very accurately. Any kind of play has to be avoided. The ordinary transmission gearing in machinery of a similar form having a pair of toothed gears, one of which is rotatable and the other being fixed, does not suffice for the necessary accuracy of the rolling drive for a vacuum pump as the play between the teeth of the gears has deleterious effects.

An object of the invention is to avoid the play occurring between the gear teeth by providing more than one set of interengaging gear teeth, offset with respect to each other and with respect to the angle of the gear tooth relief.

Preferably, the piston can be provided at each of its lateral faces with an internal gearing which engages with a corresponding fixed pinion mounted on one axis. Two pairs of interengaging gears are thus provided which are coaxial instead of one single pair of gears.

In order to eliminate the deleterious play at the curvature of the gear teeth, the piston, during assembly, is first brought into the theoretically predetermined position which corresponds with the mathematically determined position therefor and the two adjustable pinions are then displaced with respect to each other in such a manner until the deleterious play at the gear curvature is eliminated.

Preferably an adjustment of the piston position is effected by a lead angle corresponding to the end play in order to counteract the frictional forces acting against the circumference. To do this, the piston is first positioned against the frictional forces by means of one of two pinions. This piston can thus escape, in the direction of the frictional forces, only by a distance equal to the end curvature of the gear teeth. This possibility of escape can, however, be avoided by a suitable location of the second pinion, so that the piston is adjusted by means of a lead counteracting the frictional forces.

The structure, organization, and operation of the invention will now be described more specifically with reference to the accompanying drawing, wherein the single figure shows a schematic perspective view of a drive for a piston, preferably of hypotrochoidal form and having a transmission ratio of 1:2.

The drawing shows the drive mechanism highly simplified. A piston 10 carries out a circular rolling motion in the direction of the arrow in a housing 23. A circular inner toothing 12 at one end face of the piston 10 rolls on a pinion 14 fixed to the housing 23, through which extends a drive shaft 16. The driving torque is transmitted to the piston 10 by an eccentric 18 secured to the shaft 16.

Accuracy of transmission and control of the rolling motion of the piston is obtained by the use of a second pair of gear teeth. A second gear 20 is connected to the housing 23 at the end of the piston 10 remote from the toothed piston 14. The gear 20 meshes with a corresponding second internal toothing 22 on the piston 10; the internal teeth 12 and 22 are likewise similar. If the piston is in a theoretically correct position, then this position can be accurately determined and without play by relatively, angularly offsetting the two gears 14 and 20. The gears 14 and 20 are fixed to the housing in such a manner that an angular adjustment about their axes is possible. The angle of play is shown highly exaggerated in the drawing. The mutual twist is made clear by the angles $\alpha$ and $\beta$.

The offset arrangement thus provides for adjustment and elimination of the play of the gearing and the piston is precisely driven.

If the piston is to be given a lead in order to overcome the frictional forces at its circumference, then it is first held in the direction counteracting the frictional forces. A pinion, for example, pinion 20, is rotated in the direction of rotation of the piston and then fixed. To prevent slip of the piston due to the curved sides of the gearing, the second pinion, then pinion 14, is fixed in a position singularly offset with respect to the pinion 20 by the complete angle of play at the sides of the gearing. This adjustment provides lead of the piston without play.

Further features of a pump in accordance with the present invention are shown and described in detail in the copending applications by the inventor herein filed at the same date, Oct. 6, 1967, and entitled:

Oil Sealing of Rotary Piston Vacuum Pump, Ser. No. 673,359.

End Face Sealing in Rotary Piston Vacuum Pump, Ser. No. 673,337.

Oil Circulation in Rotary Piston Vacuum Pump, Ser. No. 673,336.

We claim:
1. A rotary piston vacuum pump having a housing (23) and an eccentrically rotatable hypotrochoidal piston (10) rotatable in said housing, said housing having the form of an enveloping figure;
   drive means (18) including a drive shaft (16) engaging said piston;

internal toothing (12, 22) formed in each of the end faces of the piston;

a pinion (14, 20) each meshing with a respective toothing, the pinions being coaxially mounted about said drive shaft and secured against rotation, and angularly offset with respect to each other by an amount to eliminate play between the piston and the drive shaft upon rolling off of the internal toothing on the piston over the pinions.

2. A pump according to claim 1 wherein the angular position of the pinions about the shaft is individually adjustable to provide for adjustment of the piston to be given a lead against frictional force on its periphery against the housing, during operation of the pump.

3. A pump according to claim 1 wherein said pinions are mounted on the housing to be offset with respect to each other by the complete angle of play of the sides of the toothing.

References Cited

UNITED STATES PATENTS

| | | | |
|---|---|---|---|
| 1,124,107 | 1/1915 | Bugatti | 74—409 |
| 3,037,396 | 6/1962 | Martin | 74—409 |
| 3,302,623 | 2/1967 | Zimmermann | 230—145 X |
| 3,320,876 | 5/1967 | Salvatore | 74—440 X |
| 3,398,595 | 8/1968 | Clutter | 74—409 |

LEONARD H. GERIN, Primary Examiner

U.S. Cl. X.R.

92—83

UNITED STATES PATENT OFFICE
CERTIFICATE OF CORRECTION

Patent No. 3,459,367                                              August 5, 1969

Hansen Pfaff et al.

It is certified that error appears in the above identified patent and that said Letters Patent are hereby corrected as shown below:

In the heading to the printed specification, lines 6 and 7, "to Leybold-Heraeus GmbH & Co., KG, Cologne-Bayental, Germany" should read --, by mesne assignments, to Leybold-Heraeus-Verwaltung GmbH, Koln-Bayental, Germany --.

Signed and sealed this 21st day of April 1970.

(SEAL)
Attest:

Edward M. Fletcher, Jr.                                WILLIAM E. SCHUYLER, JR.
Attesting Officer                                                Commissioner of Patents